United States Patent Office
3,432,296
Patented Mar. 11, 1969

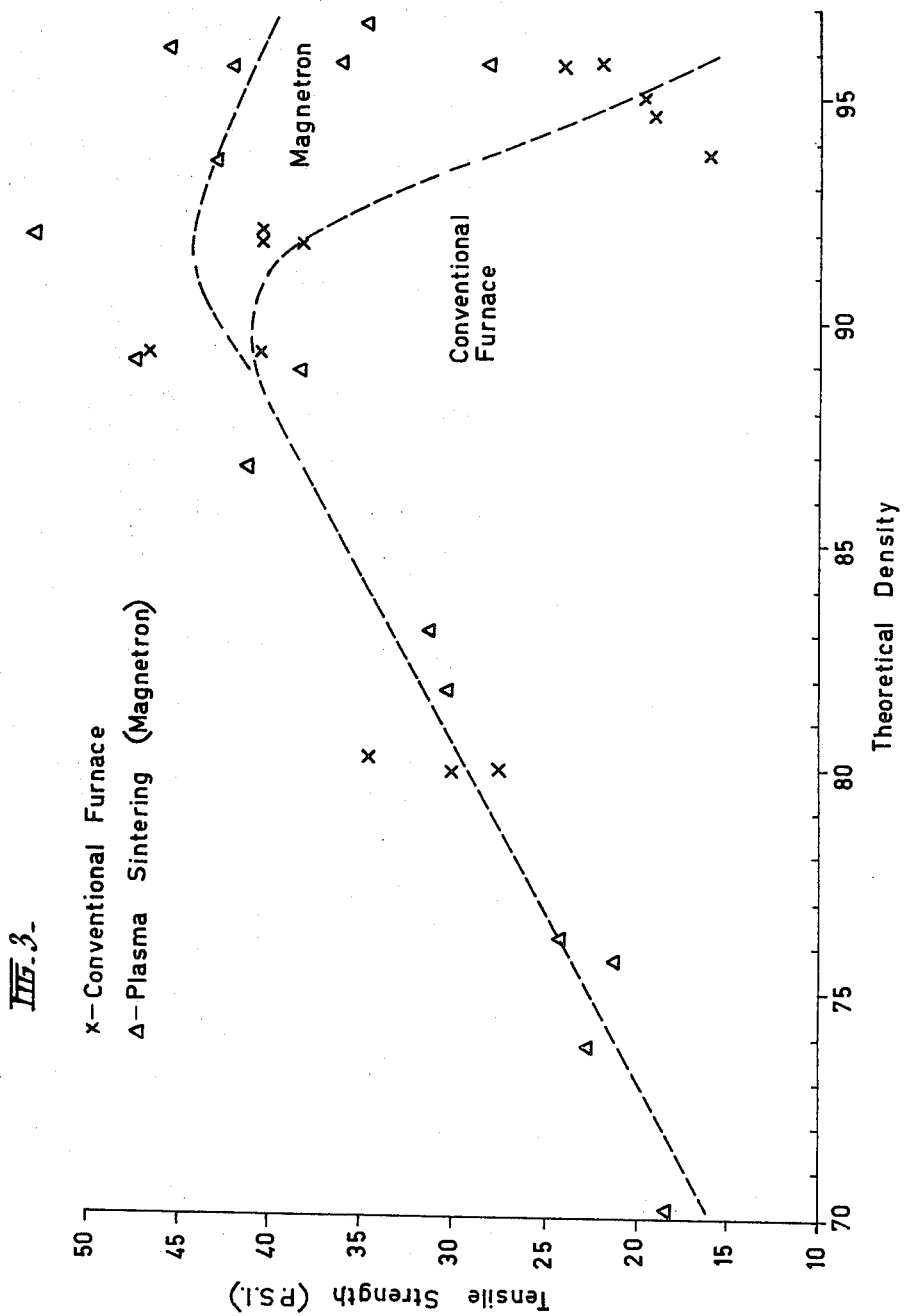

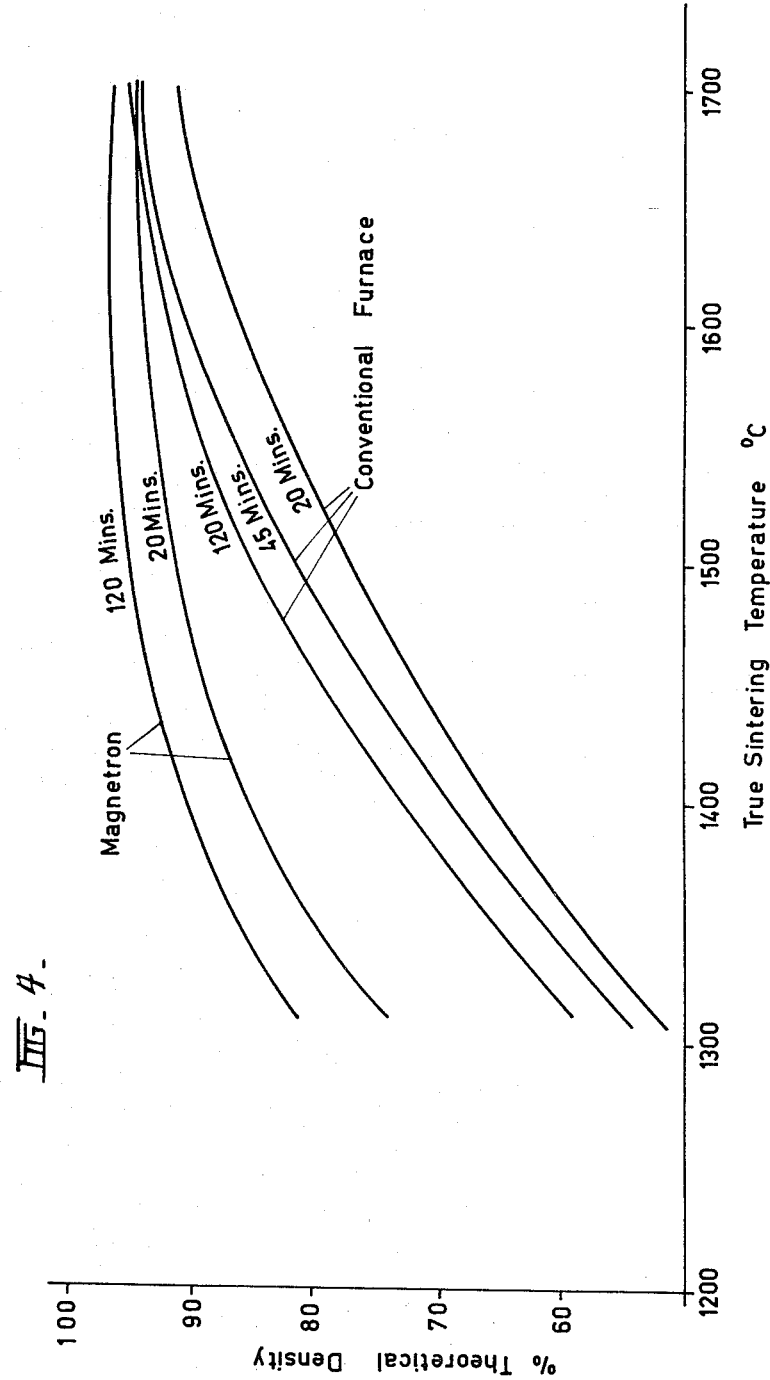

3,432,296
PLASMA SINTERING
Neil Alexander McKinnon, North Balwyn, Victoria, Colin Earl Garnsworthy Bennett, Black Rock, Victoria, Lloyd Stuart Williams, Armadale, Victoria, and Frederick Kenneth McTaggart, East Hawthorn, Victoria, Australia, assignors to Commonwealth Scientific and Industrial Research Organization, East Melbourne, Victoria, Australia, a body corporate
Filed Sept. 5, 1967, Ser. No. 665,634
Claims priority, application Australia, July 13, 1967, 24,560/67
U.S. Cl. 75—214    13 Claims
Int. Cl. B22f *1/00, 9/00*

ABSTRACT OF THE DISCLOSURE

A process for sintering particulate materials using the heating effect of a gas plasma. Materials which can be sintered include compacted, slip cast or extruded bodies of particulate metals, ceramics, intermetallic and metal-metalloid components, cermets and other refractory or semirefractory substances.

---

Figure 1:
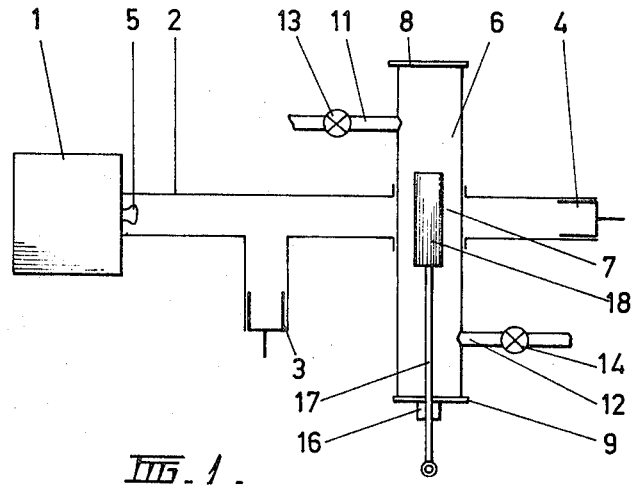

This invention relates to a process for sintering particulate materials, especially compacted, slip cast or extruded bodies thereof.

The practice of producing coherent bodies from particulate materials by sintering compacted masses of such materials is a well-known and well-established art and is particularly applicable to fabrication of articles from refractory materials such as metals, ceramics (including oxides, fluorides, nitrides, sulphides, phosphides, carbides and similar materials in simple and complex form) intermetallic and metal-metalloid compounds, cermets and other substances which are otherwise often difficult or impossible to obtain or fabricate in the massive state. In some instances it can be advantageous to apply sintering techniques to less refractory materials.

Hitherto, sintering of such materials has been carried out by heating in more or less conventional apparatus such as furnaces of known types.

We have now found that a wide variety of materials can be sintered in a gas plasma and that, moreover, sintering in this manner can be performed more rapidly and at a lower temperature than in conventional furnaces; these advantages are particularly important in sintering refractory materials. In the case of refractory ceramic materials, for example, products obtained by plasma sintering are generally superior in density, homogeneity of structure and mechanical strength to those produced by conventional methods. These improved characteristics are believed to be attributable largely to enhancement of sintering rates and uniformity of sintering by the plasma technique. A further advantage of the process lies in the fact that sintering in accordance with the invention is carried out under substantially cold wall conditions. As a result, the necessity of providing suitable highly refractory linings and heat shields as for conventional furnaces is eliminated.

In accordance with the present invention, there is provided a process for sintering a body of compacted, slip cast or extruded particulate material which comprises subjecting the body to the heating action of a gas plasma.

The term "plasma" is used herein, as elsewhere in the art, to describe a gas or other form of matter in which a large proportion of the molecules is dissociated into ions and electrons. The ions and electrons are present in approximately equal numbers so that as a whole the plasma is electrically neutral. Plasmas of this type have been described in considerable detail elsewhere and will therefore not be further described herein except as regards the methods of their production which are appropriate to this invention.

Plasmas are generated for the purposes of this invention by the use of either D.C. electric discharges or by radio-frequency (R.F.) electromagnetic energy; frequencies as low as 0.5 mHz. and as high as 10,000 mHz. may be used in the generation of R.F. plasmas.

Normally, plasmas generated by D.C. or R.F. plasma torches are at atmospheric pressure; a disadvantage of operating at atmospheric pressure is that high power R.F. or D.C. supplies are required to produce a plasma. A further disadvantage is that controlled and uniform heating of the article to be sintered is difficult to achieve in these fields of high and non-uniform power density.

In the practice of our invention, however, it is preferred to generate the plasma in a closed or semi-closed system; this permits a wider choice of the plasma-forming gas and also allows operation at pressures below atmospheric. Since the power density necessary to generate a plasma is reduced as the gas pressure is decreased, our invention permits a considerable degree of control over the power density of plasma and hence the amount of heating of the article to be sintered. By adjusting both the gas pressure and the power density suitable sintering conditions can be achieved for a wide variety of materials. We have found that for a gas pressure of 1 torr power densities as low as approximately 2 watts per cm.$^3$ can be achieved. By increasing the power input to the plasma and also increasing the gas pressure, power densities of hundreds of watts per cm.$^3$ can be produced. Operating pressures of about 1 to 50 torr have so far been used to advantage in the practice of our invention in a typical laboratory plasma sintering system. As an example of the effectiveness of plasma heating, it is found that in moderate conditions of pressure and power density materials as refractory as alumina and magnesia can be fused. At low gas pressure and low power density the heating action of the plasma on the article to be sintered is small, while at higher gas pressure and higher power density the heating action of the plasma on the article to be sintered is greatly increased. Thus, it is possible to control the rate of heating of the article to be sintered by the process of our invention by manipulating the gas pressure of the plasma and power input to the plasma.

It is preferred to produce the plasma by R.F. power supplied by suitable means. For example the power may be supplied to the system by means of a coil or waveguide surrounding, or a waveguide forming part of, the vessel in which the plasma-forming gas and the body to be sintered are contained. The R.F. power may be derived from any suitable source, e.g. a valve oscillator, klystron or magnetron; it may be delivered continuously or pulsed by the usual electronic methods.

The operating gas for the plasma may be air or any suitable polyatomic gas, or mixtures of such gases, to provide the required oxidizing, neutral or reducing atmosphere. Monatomic gases yield plasmas of relatively low energy and therefore are usually applicable only to materials which sinter at low temperatures. However, mixtures of monatomic and diatomic gases, for example, are suitable for sintering refractory materials, even with low proportions of the diatomic constituent. When it is desired to sinter a material in an oxidizing atmosphere, air is the gas normally employed, and high rates of sintering at relatively low to moderate temperatures are efficiently obtained; high specimen temperatures, well in excess of 2000° C. if desired, can be achieved. In general, the observed differences in effectiveness of heating and enhancement of sintering rates in air, oxygen, nitrogen and carbon dioxide are relatively small. If a reducing atmosphere is required, a mixture of 10 percent hydrogen in nitrogen is suitable and this gas mixture is almost comparable with air in producing a high specimen temperature and an accelerated rate of sintering.

The technique of plasma sintering not only offers a process for achieving a high and uniform temperature of the article to be sintered, but also offers a process for achieving an enhanced rate of sintering of the material when compared with sintering of the same material at the same temperature in a conventional furnace. A further feature of the plasma-sintering process described in the present invention is the considerable degree of sintering that it will effect in a refractory material without raising the material to the temperature range normally required to achieve extensive sintering. FIGURE 3 demonstrates these features of the process, as will be explained hereinafter.

It has been noted that the acceleration of rate of sintering increases markedly with decreasing particle size of the powder being sintered. The process, therefore, is particularly applicable to the sintering of extremely fine materials; compacts of such materials shrink more uniformly and are less prone to cracking and distortion when sintered by the method of our invention.

Another feature of the process of the invention is that it can readily be applied to the continuous sintering of extended bodies of particulate materials by passing them through a zone containing a gas plasma, and the invention thus includes this modification.

Although most of the materials we have so far sintered in accordance with the practice of the invention have been electrically nonconducting, the process of the invention is not restricted to nonconducting materials. Metal powders and composite metal-ceramic materials, in any combination and in extruded, pressed, or other compacted form, can also be readily plasma sintered. Further, the process is applicable to conducting materials in the broad class of ceramics noted earlier, as well as to intermetallic and metal-metalloid compounds.

Figure 2:
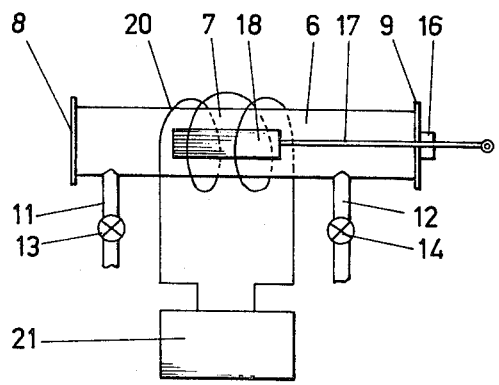

In order that the invention may be more fully understood reference will now be made to specific apparatus for carrying out the plasma sintering process and to examples of applications of the plasma sintering process to various materials. It is to be understood that the invention is not in any way limited to such apparatus, examples or materials. The apparatus is depicted in the accompanying drawings in which:

FIGURE 1 is a diagrammatic section of a simple plasma sintering apparatus for carrying out the method of the invention; and FIGURE 2 is another form of such apparatus.

In FIGURE 1 the apparatus consists of a magnetron, or other generator 1 of microwave power. The output of magnetron 1 is delivered by a radiating antenna 5 into a waveguide 2 which is provided with tuning stubs 3, 4. A silica or refractory ceramic tube 6 is inserted transversely through the waveguide at a position such that the electric field intensity in the waveguide can be adjusted to maximum within the zone 7 of the tube 6 which lies within the confines of the waveguide. The field intensity can be varied within the zone 7 by shifting the field by adjustment of the tuning stubs 3, 4. The tube 6 is provided at either end with closures such as end plates 8, 9. The tube is also provided with side arms 11, 12 and valves 13 and 14 for connection respectively to a vacuum pump and source of the plasma gas. End plate 9 is provided with a seal 16 through which passes a manipulating rod 17, by means of which the article 18 to be sintered can be moved through the electric field in zone 7.

In FIGURE 2 the tube 6 and its appurtenances are identical to those of FIGURE 1 except that the waveguide 2 is replaced by a coil 20 which surrounds the zone 7 of the tube, the coil 20 being connected to a suitable power source 21. As shown in FIGURE 2, the tube 6 is arranged along the longitudinal axis of the coil 20. This arrangement may not always give satisfactory heating and better results can be achieved, at least in some cases by arranging the tube to pass transversely through the coil, i.e. between sections of the winding. This can be achieved conveniently by using two interconnected coils arranged one on each side of the tube.

Using the apparatus of FIGURE 1, operating conditions for the following examples were generally within the range 200 to 650 watts at 2450 mHz, and 5 to 15 torr. (In these conditions, power densities were in the approximate range 12 to 40 watts/cm.$^3$).

Example 1.—Alumina (i) Compacts of "Linde A" alumina were produced by pressing the powdered material in a double-ended die to a density of 1.73 gm./cm.$^3$. The compacts were then sintered (a) in a conventional electric furnace and (b) in the apparatus of FIGURE 1 in an air plasma, at various temperatures in both cases. The results are shown graphically in FIGURE 3 as a plot of percentage theoretical densities of the sintered compacts against the sintering temperatures for various times. It is readily apparent that 20 minutes plasma sintering at 1,650° C. is as effective as 2 hours conventional thermal sintering at 1,650° C.

(ii) Specimens for determination of the bend strength of the sintered material produced by conventional and plasma techniques were prepared by isostatically pressing the powdered material to a green density of 1.97 gm./cm.$^3$ and sintering appropriately. The strengths of the sintered bars were determined in four point bending.

The results, shown graphically in FIGURE 4, indicate that for densities up to about 90% of theoretical there is no substantial difference between the strengths of the plasma sintered products and those sintered in a conventional furnace. However, at densities of the order of 95% the plasma sintered product exhibits a bend strength of 40,000 p.s.i., while that of the conventionally sintered product has fallen to 20,000 p.s.i.

Examination of polished sections shows that this marked difference in strength is due to the more uniform grain growth which occurs during plasma sintering.

Example 2.—Continuous sintering

An isostatically pressed Linde A alumina rod $\frac{5}{16}''$ dia. x 4" in length and having a "green" density of 1.97 gm./cm.$^3$ was initially located just beyond one end of an air plasma in the silica work tube (of FIGURE 1). The specimen was passed through the plasma at the rate of 2.5 mm./min. by drawing the work tube through the waveguide. The rod sintered evenly to 96% of theoretical density and was free of cracks and laminations and shows the feasibility of continuous sintering in the magnetron apparatus under substantially cold wall conditions.

Example 3.—Magnesium oxide

Basic magnesium carbonate was calcined at 600° C. for one hour. A compact of this material (0.5" dia. x 0.25") having a green density of 38% theoretical was sintered in an air plasma at 1500° C. for 20 minutes. The product had a density of 95% theoretical.

Example 4.—Hafnium oxide

A pressed compact of hafnium oxide having a green density of 47.5% theoretical was sintered in air in the apparatus of FIGURE 1 at 1500° C. for 35 minutes. The product had a density of 90% theoretical.

Example 5.—Beryllium oxide

A compact of beryllium oxide having a density of 1.68 gm./cm.$^3$ was prepared by pressing the powdered material in a double-ended die. Sintering in air in the apparatus of FIGURE 1 for 45 minutes at 1500° C. produced a sintered compact having a density of 98.2% theoretical.

Example 6.—Titanium dioxide

A compact of titanium dioxide having a density of 1.92 gm./cm.$^3$ was prepared by pressing the powdered material in a double-ended die. Sintering in the apparatus of FIGURE 1 at 1,350° C. for 30 minutes produced a sintered body having a density of 90% theoretical.

Example 7.—Nickel

Nickel powder was pressed in a double-ended die to a density of 4.92 gm./cm.$^3$. Sintering in the apparatus of FIGURE 1 for 15 minutes at 1,215° C. in an atmosphere of 10% hydrogen in nitrogen yielded a body of 90% theoretical density.

Example 8.—Nickel/aluminium oxide

A mixture of nickel and alumina powders in the ratio 1:3 by weight, were compacted by double-ended die pressing and sintered in the apparatus of FIGURE 1 in an atmosphere of 10% hydrogen in nitrogen and at a temperature of 1,275° C. for 10 minutes. A uniformly sintered body resulted.

It will be appreciated that the above examples are merely indicative of the broad applicability of our process of plasma sintering to the production of coherent bodies from particulate materials. It is to be understood that in some of the examples improved densification would be achieved with more finely divided starting materials; also, the apparatus can be readily scaled-up and much larger articles can be effectively sintered. In addition to the materials of the examples. other materials in the broad class of ceramics noted earlier can be effectively sintered, and thus the invention includes plasma-sintering of such materials.

It will also be appreciated that modifications, other than those described, can be made to process of the invention. For example, R.F. power sources of different types and/or operating frequencies may be employed as well as other forms of resonant cavity enclosures. Furthermore, the application of pressure to the article during heating in the plama to assist sintering constitutes a further modification to the process. This modification is particularly advantageous in the case of powder mixtures of components in which a solid state reaction occurs during the sintering operation. It should be understood that the invention incudes all such modifications which fall within its spirit and scope.

We claim:

1. A process for sintering a body of an inorganic particulate material which comprises immersing the entire body in a gas plasma produced by interaction of radio-frequency electromagnetic energy with the gas, and thus heating the body to accomplish sintering.

2. The process of claim 1, wherein the material is selected from the group consisting of metals, metalloids, ceramics and refractory materias, intermetallic and metal-metalloid compounds, cermets and mixtures thereof.

3. The process of claim 1, wherein the frequency of the radio-frequency electromagnetic energy is between about 0.5 and about 10,000 mHz.

4. The process of claim 1, wherein the plasma is generated in a zone forming part of a waveguide to which the electromagnetic energy is supplied.

5. The process of claim 1, wherein the plasma is generated in a zone at least part of which is surrounded by a waveguide to which the electromagnetic energy is supplied.

6. The process of claim 1, wherein the plasma is generated in a zone at least part of which is adjacent to a coil to which the electromagnetic energy is supplied.

7. The process of claim 1, wherein the plasma is generated in a zone which is at least partially closed.

8. The process of claim 1, wherein the plasma is generated in a closed vessel and the plasma-forming gas is present in the vessel at a pressure below normal atmospheric pressure.

9. The process of claim 9, wherein the pressure of the plasma-forming gas in the said vessel is from about 1 to 50 torr.

10. The process of claim 1, wherein the plasma-forming gas is selected from the group comprising polyatomic gases and mixtures of monatomic gases with polyatomic gases.

11. The process of claim 11, where the plasma-forming gas is air.

12. A process for sintering a body of particulate material which comprises placing the body in a gas plasma generated by the action of radio-frequency electromagnetic energy on a gas consisting at least partially of polyatomic molecules; said energy being supplied at a frequency of from about 0.5 to about 10,000 mHz.; the pressure of said gas being from about 1 to about 50 torr; and the power density within the plasma being at least 2 watts/cm.$^3$.

13. A process for sintering an extended body of particular material which comprises immersing the body in a zone containing a gas plasma, whereby the material immersed in the zone is sintered by the heating action of the plasma, the plasma being produced by interaction of radio-frequency electromagnetic energy with gas in the zone.

References Cited

UNITED STATES PATENTS

| | | | |
|---|---|---|---|
| 3,121,630 | 2/1964 | Bussard | 75—214 XR |
| 3,247,579 | 4/1966 | Cattermole et al. | 219—76 XR |

FOREIGN PATENTS 1,014,484  12/1965  Great Britain.

OTHER REFERENCES

Thorpe: "The Plasma Jet and its Uses," Research and Development, January 1960, pp. 5–9, 11, 12 and 15.

BENJAMIN R. PADGETT, *Primary Examiner.*

A. J. STEINER, *Assistant Examiner.*

U.S. Cl. X.R.

75—200; 219—121; 264—125